United States Patent [19]

Migut

[11] Patent Number: 4,685,731

[45] Date of Patent: Aug. 11, 1987

[54] TANK CREW SEAT STRUCTURE

[76] Inventor: Gary J. Migut, 2652 W. Walton Blvd., Pontiac, Mich. 48055

[21] Appl. No.: 791,966

[22] Filed: Oct. 28, 1985

[51] Int. Cl.⁴ .......................... A47C 3/20; A47B 9/00; F16M 11/24
[52] U.S. Cl. .................................. 297/347; 108/147; 248/404; 248/421; 297/339
[58] Field of Search ............... 297/347, 345, 338, 339, 297/330; 108/147, 144, 145; 248/162.1, 404, 157, 421

[56] References Cited

U.S. PATENT DOCUMENTS

| 722,166 | 3/1903 | Taft | 108/147 X |
|---|---|---|---|
| 1,846,607 | 2/1932 | Nicholas | 108/36 |
| 2,678,087 | 5/1954 | McKinley | 297/347 X |
| 2,821,242 | 1/1958 | Manegold | 297/347 X |
| 4,176,878 | 12/1979 | Koutsky | 297/417 X |
| 4,461,444 | 7/1984 | Grassl et al. | 297/347 X |
| 4,558,648 | 12/1985 | Franklin et al. | 108/147 |

FOREIGN PATENT DOCUMENTS

| 73096 | 3/1983 | European Pat. Off. | 297/347 |
|---|---|---|---|
| 29858 | 7/1884 | Fed. Rep. of Germany | 108/147 |
| 2129678 | 5/1984 | United Kingdom | 297/347 |

Primary Examiner—Kenneth J. Dorner
Assistant Examiner—Mark W. Binder

[57] ABSTRACT

Mechanism for raising/lowering a seat structure. A motor-operated screw-nut assembly is operatively connected to the seat structure via a lazy tongs support system. Laterally spaced guide devices give the support system a desired wide-stance stability that prevents undesired lateral dislocation of the seat structure. The support mechanism is compactly arranged beneath the seat structure, whereby the assembly is adapted to be used in military vehicles.

3 Claims, 10 Drawing Figures 4,685,731

TANK CREW SEAT STRUCTURE

GOVERNMENT INTEREST

The invention described herein may be manufactured, used, and licensed by or for the Government for governmental purposes without Payment to me of any royalty thereon.

BACKGROUND AND SUMMARY OF THE INVENTION

This invention relates to a seat structure especially designed for use in a military tank e.g., the M1 or M60 tank used by U.S. military forces. The seat structure is made to be adjustable in the vertical direction, as well as in the front-to-rear direction. A seat belt restraint system is included for enabling the seat occupant to be rigidly strapped down (combat mode) or loosely strapped down (non-combat mode). The structural assembly is designed to make maximum use of existing hardware (already developed).

The invention is believed to lie principally in the mechanism for adjusting the seat structure in the vertical direction. That mechanism includes an electric motor and lazy tong means arranged within the plan dimension of the seat platform. The mechanism is design to occupy a minimum amount of floor space, while achieving a fairly large height adjustment of the seat structure, e.g., ten inches.

Preferably the seat structure is provided with occupant-restraint means that includes lap belt means and shoulder belt means. The two belt systems cooperate to rigidly lock the human occupant against both vertical dislocation and fore-aft dislocations, that might otherwise result during off-highway operations over rough and uneven terrain.

THE DRAWINGS

Figure 1:
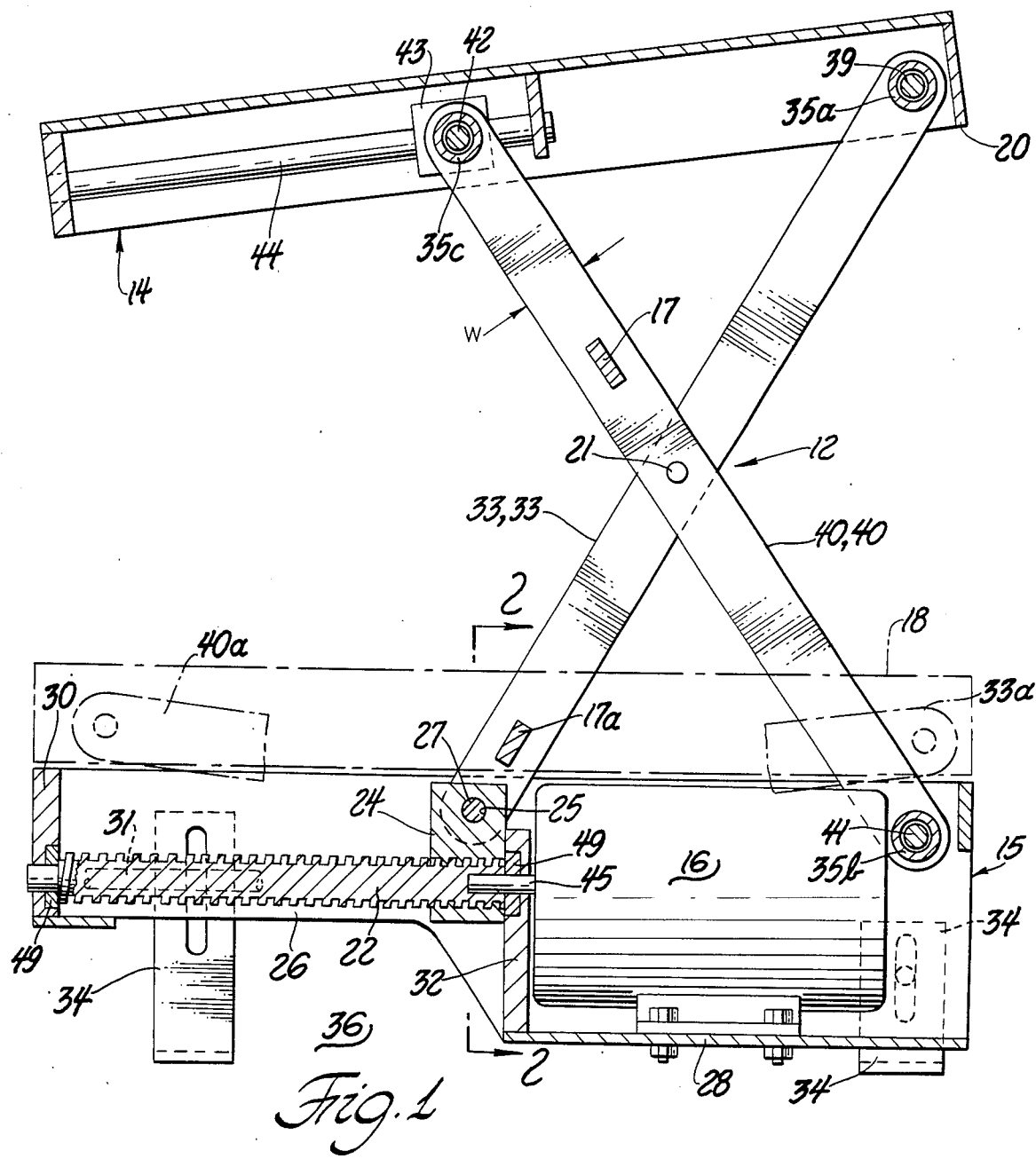
FIG. 1 is a sectional view taken through a seat height adjustment structure embodying my invention.

FIG. 1 shows a seat support mechanism that includes a base structure 15 and seat support platform 14; a lazy tong connection 12 interconnects the platform and base structure. The seat structure is not visible in FIG. 1. In practice the seat structure would be affixed to the upper face of platform 14, as shown generally in FIG. 4. An electric motor 16 in base structure 15 (FIG. 1) provides the motive force for elevating the platform from a "down" position 18 (dashed lines) to an "up" position 20 (full lines). The platform can take various intermediate positions between these two extremes. A rotary screw 22 - nut 24 assembly is driven by the motor to open or close the lazy tongs 12 (thereby changing the position of platform 14).

Base structure 14 could be constructed in various ways. As shown, the base structure includes two side plates 26, a bottom plate 28, end plate or wall 30, and intermediate plate 32. Adjustable foot structures 34 can be used to insure a desired attitude of the base structure in a military tank; after the base structure is in place the foot structures may be welded to side plates 26. In service the base structure is firmly and rigidly connected to the bottom wall of the tank. The lower edges of side plates 26 are cut away near the front end of the base structure to provide a free space 36 for accomodating a sloping tank bottom wall (not shown). The fore-aft length of the base structure is dictated by the locality of the conventional torsion bars (suspension system) that run transversely across the tank bottom wall.

The aforementioned rotary screw 22 is located on the longitudinal axis of base structure 15, i.e., midway between side plates 26. The associated nut 24 is engaged with the screw threads, such that screw rotation causes the nut to move along the screw axis in the space between walls 30 and 32. This action operates the aforementioned lazy tongs 12 between a first condition wherein links 33 and 40 occupy upright positions (FIG. 1) and a second condition wherein the links are in prone positions, not fully apparent in the drawings. The prone positions of links 33 and 40 are fragmentarily indicated by numerals 33a and 40a in FIG. 1. The lazy tongs can be stopped in any desired position between the upright and prone positions.

Lazy tongs 12 includes two links numbered 33, and two links numbered 40. These link assemblies are arranged in pairs at opposite sides of the overall structure, i.e., one set of links 33,40 near the plane of one side wall 26, and another set of links 33,40 near the plane of the other side wall 26. Each set of links is constructed so that the plane of link 40 is inside the plane of link 33; the links take the form of flat steel bars arranged in face-to-face engagement. A pivot connection 21 interconnects the links in each link set. The central space between the two link sets is left largely vacant to accomodate the upper portion of motor 16. However a brace bar 17 may extend across the central space, (between links 40) to rigidify the lazy tongs structure.

Figure 2:
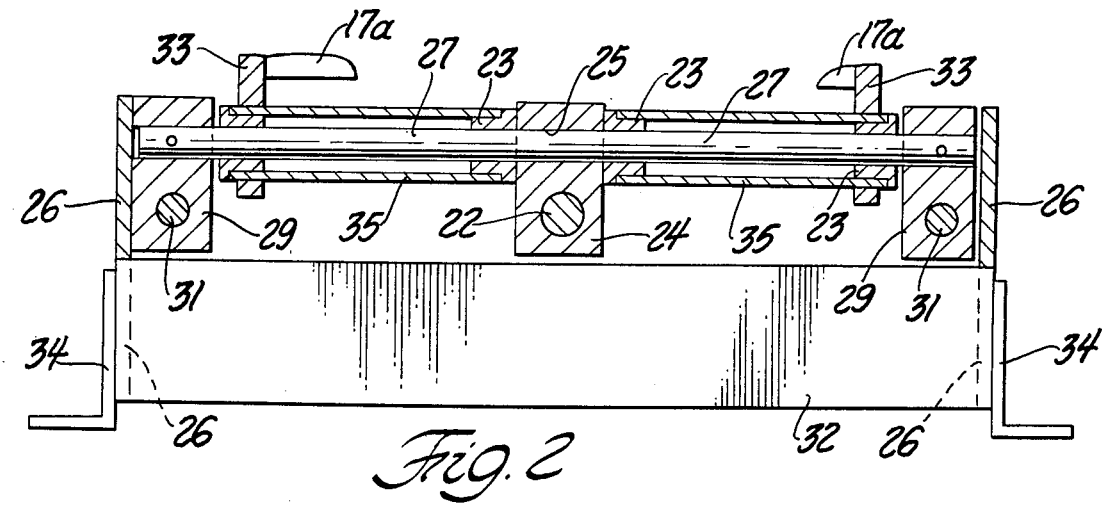
FIG. 2 is a sectional view taken on line 2—2 in FIG. 1.

The connection between nut 24 and the lazy tongs structure is best seen in FIG. 2. Nut 24 has a transverse hole 25 therethrough that accomodates a transverse shaft 27. Opposite ends of this shaft are pinned to blocks 29 which slide on stationary guide rods (shafts) 31 that are trained between walls 30 and 32 (shown in FIG. 1). The assembly of blocks 29 and shaft 27 prevents undesired rotation of nut 24. This assembly also provides a support structure for the left (lower) ends of links 33,33.

As seen in FIG. 2, shaft 27 is encircled by sleeves or tubes 35. Collars 23 may be mated to tubes 35 for friction-reducing purposes. End areas of links 33 are welded to tubes 35 near their outer ends. The other end of each link 33 is welded to a sleeve 35a (FIG. 1) that encircles a rod or shaft 39 suitably affixed to platform 14. Collars similar to aforementioned collars 23 may be interposed between tube 35a and rod 39. As a weightreduction expedient, rod 39 could be replaced by two shortened rod sections at opposite sides of platform 14.

The lower (right) ends of links 40,40 are welded to sleeve 35b that encircles a transverse rod 41 suitably affixed to base structure 15. The upper (left) ends of links 40,40 are welded to a transverse sleeve (tube) 35c that encircles a rod 42. Collars similar to aforementioned collars 23 may be located in opposite ends of sleeves 35b and 35c for friction-reducer purposes.

Rod 42 has its opposite ends pinned or otherwise affixed to blocks 43 that run on guide rods 44. Rods 44 are located directly above rods 31, shown in FIG. 2. During up-down motion of platform 14 the various blocks 43 and 29 slide on their respective guide rods 44 and 31. Platform 14 movement is such that the attitude of the platform changes slightly as the platform moves up and down. When the platform is in its "down" position it has an essentially horizontal attitude. In the "full up" position the platform is slightly tilted in a rear-to-front direction. The purpose for the tilt action is to enable a tall person to more easily get his knees under controls within the tank when the seat is at or near its highest position of adjustment. When the seat is at or near its lowest position of adjustment there is no need to tilt the seat structure.

The tilt action is achieved by dimensioning the lazy tongs structure so that links 33 are slightly longer than links 40. Pivot connections 21 are located so that the distance between shaft 41 and pivot 21 is slightly greater than the distance between pivot 21 and shaft 42; also, the distance between shaft 27 and pivot 21 is slightly less than the distance between pivot 21 and shaft 39. The various shafts 27, 39, 41 and 42 are located so that the weight of the human seat occupant is centered in a vertical plane falling somewhere near pivot 21 (in most positions of seat adjustment).

FIG. 3

Figure 3:
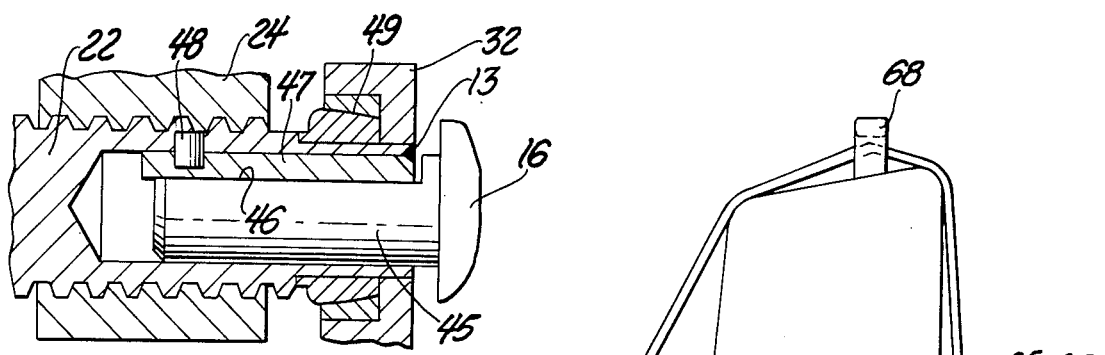
FIG. 3 is an enlarged fragmentary sectional view of a shaft-screw connection used in the FIG. 1 mechanism.
Figure 3A:
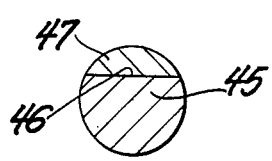
FIG. 3a shows a shaft detail in the FIG. 3 sub-assembly.

FIG. 3 shows a shaft-screw connection designed to reduce axial loadings on motor 16. The motor shaft 45 has a flat surface 46 that mates with the flat surface of a key 47; a plug weld 48 and a fillet weld 13 secure key 47 to screw 22. The structural arrangement permits shaft 45 to apply a turning force to the screw without experiencing any axial load. Axial loads are absorbed by a thrust bearing 49 arranged between screw 22 and stationary wall 32. The motor sees no axial load forces. A similar thrust bearing is used on wall 30.

The seat adjustment structure of FIGS. 1–3 is believed to have the following general advantages:

1. Space above platform 14 is entirely unobstructed (no posts, standards, etc. to get in the seat occupant's way).
2. The platform has a fairly large adjustment travel distance (about 10-12 inches) for accomodating a range of body types.
3. The motor-screw mechanism is compactly arranged within base 15 (very little unused space).
4. The moving parts are at least partly shielded from the user's legs or clothing (especially in the "down" position).
5. Transverse shafts 27, 39, 41 and 42 provide a "wide stance" support against undesired shift of the platform laterally.
6. Links 33 and 40 are designed to give platform 14 a slight fore-aft inclination in the "up" position. This enables large size persons to get their knees underneath controls located in front of the seat (the seat inclination is not needed by smaller persons).

FIGS. 4-5 SEAT CONSTRUCTION

Figure 4:
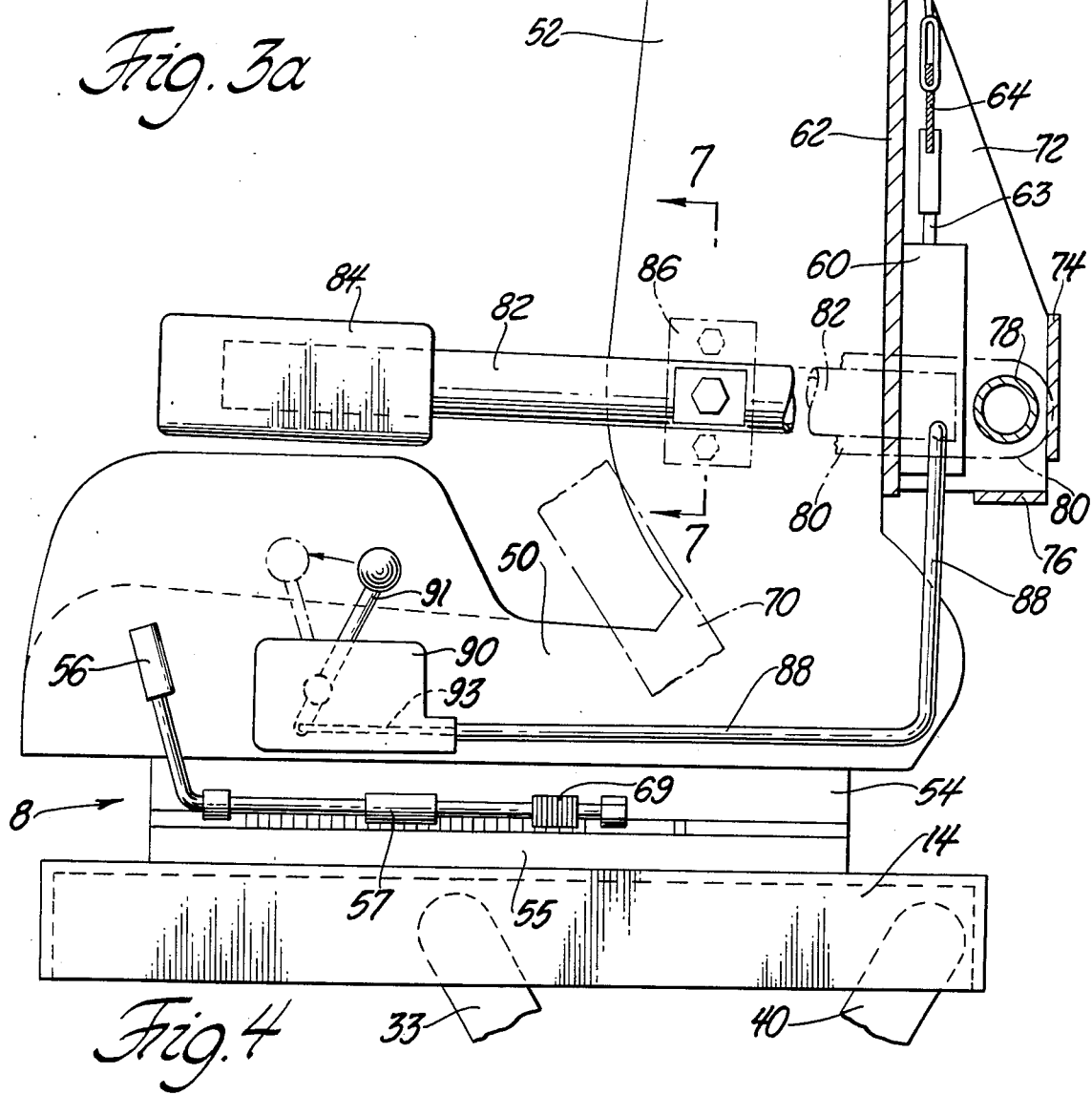
FIG. 4 is a side elevational view of a seat structure embodying my invention, with certain parts thereof broken away to illustrate structural details.
Figure 5:
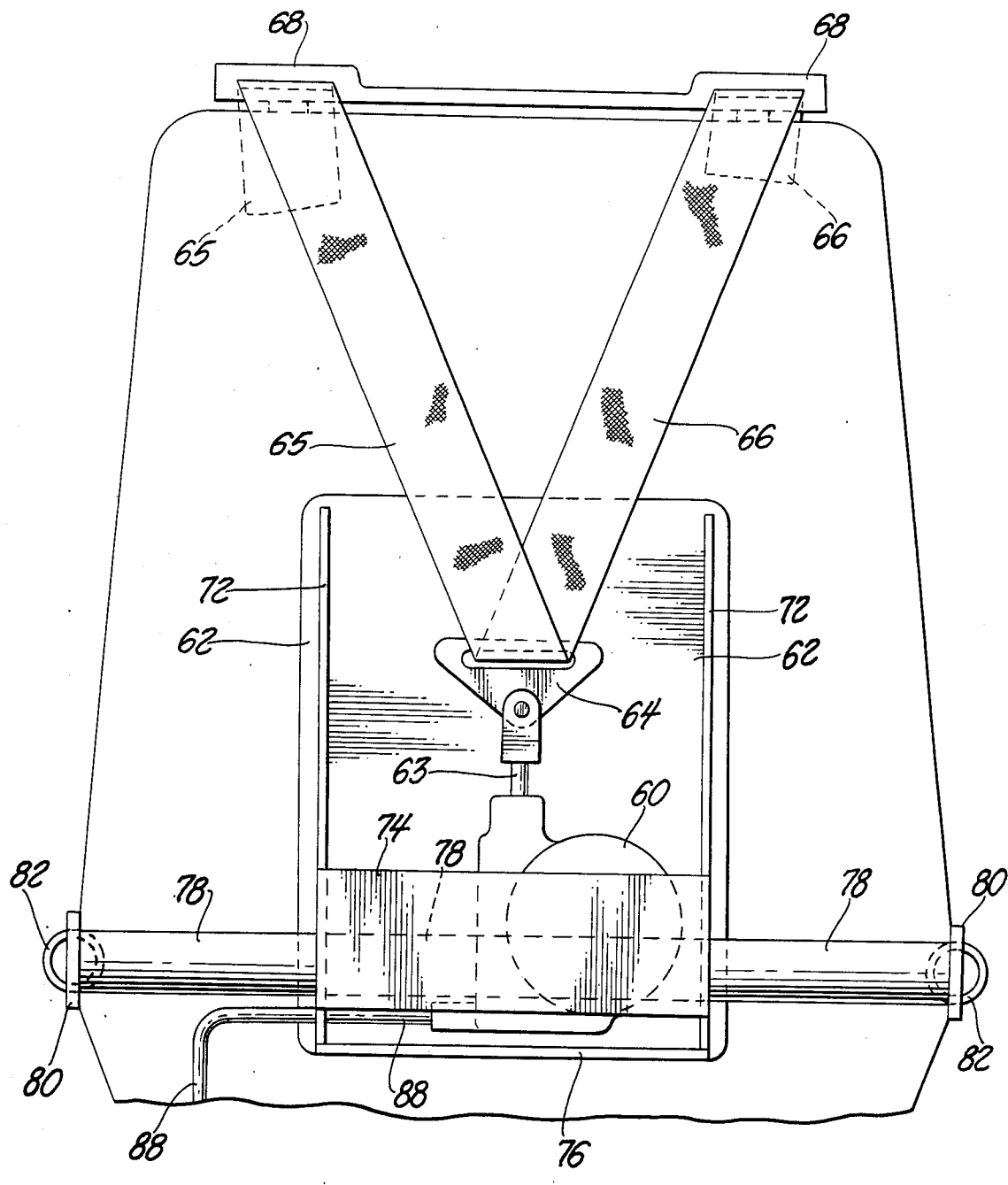
FIG. 5 is a rear elevational view of the FIG. 4 seat structure.

FIGS. 4 and 5 fragmentarily illustrate the seat structure that is to be used with the adjustment mechanism of FIGS. 1-3. The structure includes a conventional padded unit of the type already available as a special option with certain high performance automobiles. The unit is a "bucket" type unit that includes a seat portion 50 and back portion 52. The underside of seat portion 50 is affixed to conventional slide units 54 that can move fore-and-aft on a stationary guide system 55 affixed to platform 14. Manual lever 56 operates a detent plate 57 that releasably retains the seat structure in its various adjusted positions.

FORE-AFT SEAT ADJUSTMENT

Figure 8:
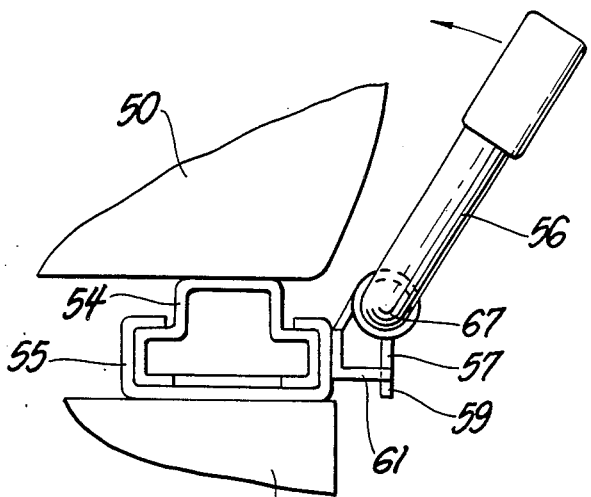
FIG. 8 is a fragmentary front elevational view of the FIG. 4 structure, taken in the direction of arrow 8 (FIG. 4).

The fore-aft seat adjustment structure can take various forms. As shown in FIG. 8 the structure includes detent plate 57 having downwardly-extending fingers 59 adapted to enter into notches in a fixed plate 61. Lever 56 is swingable around axis 67 to move fingers 59 into or out of the notches in plate 61. A torsion spring 69 (FIG. 4) may be provided to normally retain the lever in position to prevent fore-aft movement of the seat structure.

OCCUPANT RESTRAINT SYSTEM

I have added to the conventional seat structure a belt restraint mechnaism not heretofore used in military tanks. The restraint mechanism includes a reel 60 (FIG. 4) affixed to a steel plate 62 that is bolted to the rear face of seat back portion 42. A cable 63 extends from reel 60 to a metal bracket (anchorage) 64 for belts 65 and 66 (actually one continuous belt extending through a slot in the bracket). Belts 65 and 66 extend upwardly along the back of the seat, through guides 68, and then downwardly across the seat occupant's shoulders. Two additional belts (shown fragmentarily at 70 in FIG. 4) extend around the occupant's leg-hip areas to non-illustrated buckle-type connections with the front ends of belts 65 and 66. The belts are released by unbuckling the free ends of the various belts 65, 66 and 70 (2 places), as shown generally in FIG. 9.

The aforementioned plate 62 has two plates 72 projecting right angularly from its rear face. Additional plates 74 and 76 are welded to the rear edges of plates 72; this plate assembly forms a strong box-like unit that adequately supports reel unit 60 against high loads imposed thereon by belts 65 and 66. The box-like support unit also supports a transverse tube 78 that extends through circular openings in plates 72; tube 78 is welded to plates 72,72.

SEAT ARM SUPPORT STRUCTURE—FIGS. 4,5

At its outer ends tube 78 is welded to thick plates 80 that are in turn welded to tubes 82 running from front-to-rear at the sides of the seat structure. The forward ends of tubes 82 extend into conventional hand grips 84 that in practice would carry control switches used by the seat occupant (either the driver, gunner or commander, depending on the seat location in the vehicle). Tubes 82 and hand grips 84 form arm structures for the seat unit. Clamp-type brackets 86 rigidly connect tubes 82 to side surface areas of the seat structure.

Figure 7:
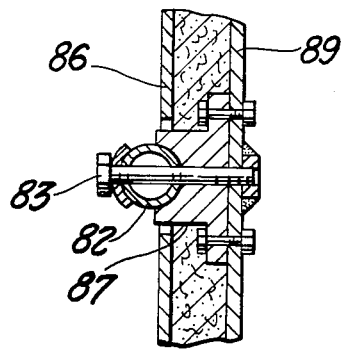
FIG. 7 is a fragmentary sectional view on line 7—7 in FIG. 4.

Brackets 86 may be constructed in various different ways. As shown in FIG. 7, the bracket comprises a block 87 suitably bolted, or otherwise affixed, to a main support wall 89 for the seat structure. The associated tube 82 is engaged in a semi-circular recess in the outer face of block 87. A screw 83 clamps the tube to block 87.

The structure shown in FIGS. 4 and 5 is believed to have the following general advantages:

1. The assembly of plates (62, 72, 74, etc) and tubes (78,82) is a comparatively strong rigid unit that provides an existing seat structure with a belt-restraint capability at relatively low cost. Little or no modification of the seat structure is required.

2. The plate-tube assembly is designed to accept a generally conventional reel 60 and control system, thus minimizing design effort and design risk.

3. Tubes 82 constitute a simple low cost mechanism for mounting the control units 84 within reach of the seat occupant's hands. The tubes take up very little space and do not pose any significant obstruction against the crewman entering or leaving the seat.

REEL 60 ACTUATION

Aformentioned reel structure 60 is preferably designed to have two different operational modes, here termed the "manual" mode and the "automatic" mode. In the "manual" mode the reel is rigidly locked against rotation in the unwind direction; cable 63 cannot unwind from the reel so that belts 65 and 66 act as rigid unyielding restraints on the person's shoulder-chest area. The manual mode is used during combat situations when the vehicle is apt to be driven at high speeds (30–50 m.p.h.) over rough terrain; the crew members than need to be restrained against bumping up-down or sidewise relative to the seat structure.

In the "automatic" mode reel 60 is locked by a conventional pendulum device responsive to high acceleration forces. Cable 63 can be wound/unwound on the reel by manual force on belts 65, 66, e.g., normal motions of the seat occupant. During crash situations the reel assumes a locked condition. The automatic mode would be used in non-combat situations, e.g., peacetime travel on paved roads or at low speeds, when the seat occupant desires a certain freedom to shift around in the seat.

Reel 60 is shifted between the "manual" and "automatic" modes by a lanyard type control of generally known construction. A guide tube 88 extends from the reel 60 housing along the rear surface of the seat structure, and forwardly along the side surface of the seat to a housing 90 (bolted to the seat side surface). A cable (or wire) 93 runs within tube 88 from a latch actuator in the reel 60 housing to a lever operator 91 supported in housing 90 (see FIG. 4). Manual motion of lever 91 places the reel housing in the "manual" or "automatic" mode.

Reel 60 is a conventional structure. As illustratively shown in FIG. 6, the reel comprises a housing 94 that rotatably supports a winding drum 95 for cable 63. Drum 95 carries a heavy swingable pendulum 97, whose outer edge is adapted to engage an interior surface of housing 94 when the drum is accelerated at a high rate, e.g., in a crash situation. Under high acceleration motion of drum 95 in a clockwise direction heavy pendulum 97 tends to remain at rest; if the swing axis of pendulum 97 is slightly offset from the drum rotational axis the pendulum will impact the interior surface of housing 94, thereby exerting a brake action against reel rotation. Under low acceleration conditions the tension spring 98 will keep the pendulum out of contact with the interior surface of housing 94.

Drum 95 can be locked against rotation by manual movement of cable (wire) 93 in a rightward direction. Bell crank 99 swings in a counterclockwise direction to engage a notch in an edge of a plate 100 carried by the drum. Cable 93 is operated by means of lever 91 (FIG. 4).

Figure 6:
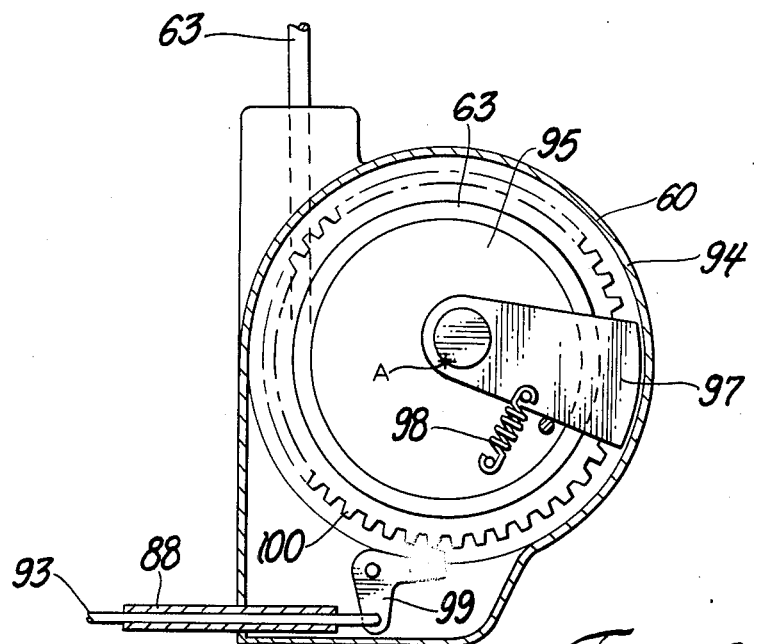
FIG. 6 is a sectional view through a reel structure usable on the FIG. 4 seat.

The reel 60 includes a spring motor (not shown) for operating drum 95 in the counterclockwise (wind-up) direction. FIG. 6 schematically illustrates general features of the pendulum and manual lock mechanism for enabling the belt system to be operated in the combat mode (fully locked) or non-combat mode (automatic pendulum lock action).

BELT CONNECTIONS

Figure 9:
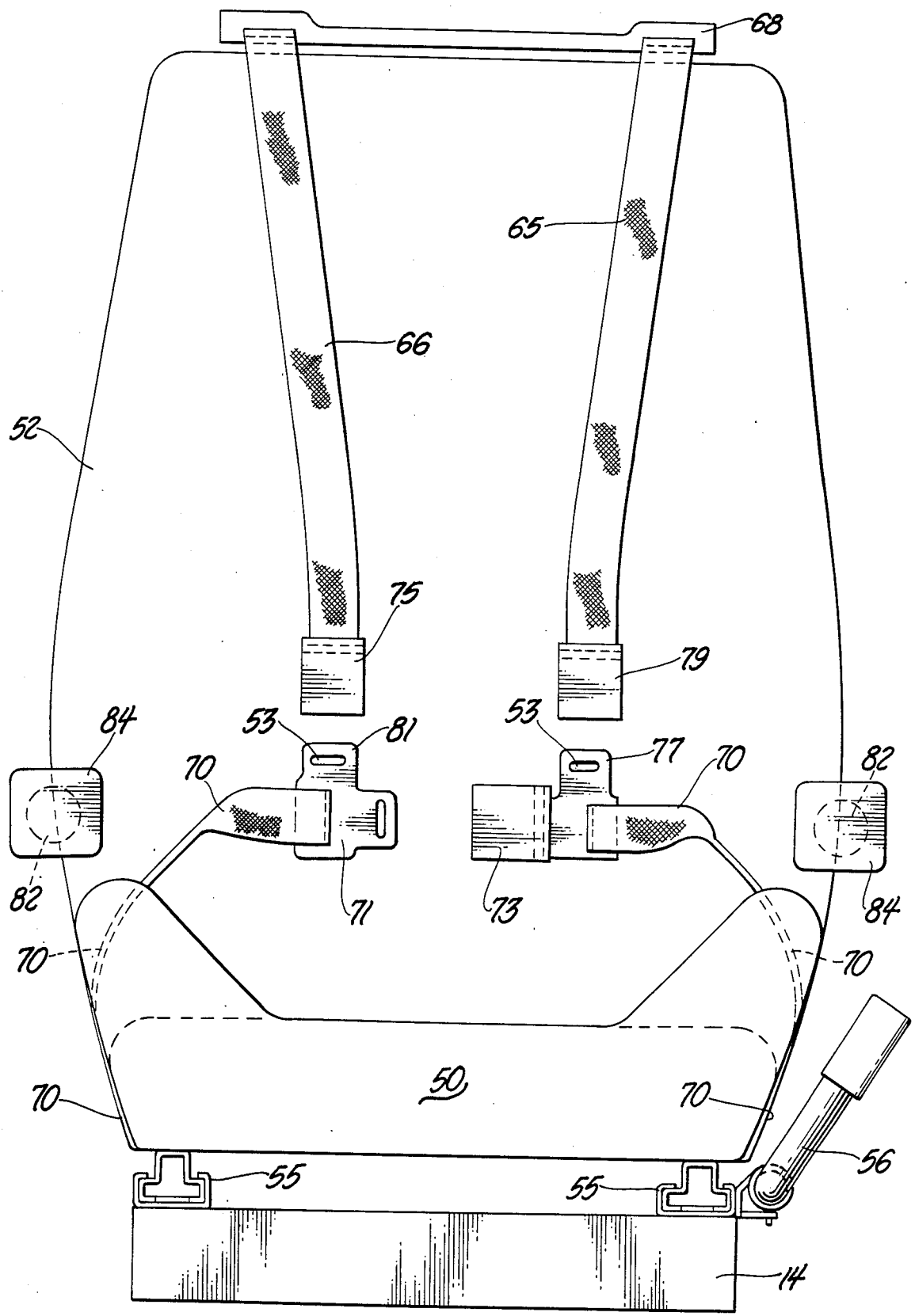
FIG. 9 is a front elevational view of the FIG. 4 seat mechanism, illustrating occupant-restraint belts used thereon.

FIG. 9 illustrates one possible way in which the four occupant-restraint belts 65, 66, 70 and 70 may be interconnected; other interconnection mechanisms could be used. In the illustrated arrangement a lock plate 71 carried by one belt 70 may be inserted into a buckle structure 73 carried by the other belt 70, to thus connect those two belts together. Belt 66 may be connected to plate extension 81 of lock plate 71 by means of a buckle structure 75. Belt 65 may be connected to a lock plate extension 77 (carried by buckle 73) by means of a bucke structure 79.

Buckle structures 73, 75 and 79 are preferably conventional structures that comprise socket devices for the mating lock plates, together with spring-urged latches that can be manually retracted to disconnect the associated belts. The lock plates 71, 81, 77 have openings 53 therethrough cooperable with the mating latches.

FEATURES OF THE INVENTION

The illustrated arrangement is considered especially useful in military tanks where interior space is relatively restricted. As seen in FIG. 1, base 15 and platform 14 have vertical dimensions that are only slightly greater than the vertical dimension of motor 16 and the width dimension W of individual link elements 33,40. This means that when platform 15 is in its lowered position the total height dimension of the base-platform assembly is relatively small. Such a small vertical dimension is helpful in reducing the overall size of the seat structure. A small size seat structure reduces the obstructing effect the structure might have as regards instrument placement and human maneuverability into or out of the tank.

The base and platform have front-to-rear dimensions (FIG. 1) that are only slightly greater than the lengths of individual link elements 33 and 40. The base-platform assembly fits underneath the seat structure without protruding beyond the seat structure plan dimension. Thus, the size of the seat assembly is not appreciably increased by the addition of the vertical adjustment mechanism.

As previously noted, the link elements 33 and 40 are arranged in link element pairs at opposite side areas of the base-platform assembly, each link element 33 and adjacent link element 40 constituting one link element pair. The link ends are joined together by means of elongated tubes 35a, 35b, and 35c, as well as transverse brace bars 17 and 17a. The structural arrangement is believed to be relatively well suited to use in military tanks that are subject to shock loadings (when traversing rough terrain).

Transverse shaft 27 (FIGS. 1 and 2) is preferably located relatively close to screw 22, such that loadings on nut 24 are not allowed to exert significant off-center forces on the threads of the nut and screw. Assuming a sufficient rigidity in shaft 27 (against bending forces), the vertical load force will be transmitted from the shaft though blocks 29 into guide rods 31, rather than onto nut 24 and screw 22. The screw will be required to handle only the turning loads needed to advance nut 24.

Bearings 49 are provided in walls 30 and 32 to mount screw 22 independently of motor shaft 45. This helps to prevent axial loads from being transmitted back to the motor. The motor will have a relatively low electrical power consumption, which is advantageous when the seat system is installed in a military tank already equipped with a turret-drive motor and other electrical power-consuming devices.

I wish it to be understood that I do not desire to be limited to the exact details of construction shown and described for obvious modifications will occur to a person skilled in the art, without departing from the spirit and scope of the appended claims.

I claim:

1. A vertically adjustable seat structure comprising a base (15) and a seat platform (14) located directly above the base; said base having a front end wall area (30) and an intermediate wall area (32); first thrust bearing means (49) carried by the front end wall area, and second thrust bearing means (49) carried by the intermediate wall area; a horizontal screw (22) having its ends supported in the aforementioned bearing means so that axial thrust forces on the screw are borne by the bearing means; said horizontal screw being located midway between side areas (26) of the base to define a central front-to-rear axis for the seat structure; an electrical motor (16) mounted on the base behind the intermediate wall area so that its drive shaft (45) is in axial alignment with the screw; said drive shaft having a torque-transmitting connection (46) with the screw that enables the shaft to turn the screw while preventing the screw from exerting axial force on the shaft; a nut (24) encircling the screw for motion therealong; stationary guide rods (31) located on the base near side areas (26) of the base; a guide block (29) slidable on each guide rod for horizontal movement parallel to the screw axis; transverse shaft means (27) extending between the nut and each guide block, whereby the nut, shaft means and guide blocks form a unitary structure; a sleeve (35) encircling each said transverse shaft means (27) in the space between the nut and each guide block, each sleeve having a length substantially the same as the space between the nut and respective guide block, each sleeve having a bearing collar (23) at its opposite ends encircling the associated shaft means (27) whereby each sleeve has two widely spaced support points on the shaft means; a first pair of links (33) occupying vertical planes near side areas of the base; each link (33) having one end thereof affixed to one of the above-mentioned sleeves near an outboard end of the sleeve, whereby the two links (33) can swing in unison around the transverse shaft means; the other end of each swingable link (33) having a first fixed pivot connection (35a) with a rear end area of the aforementioned seat platform; a second pair of swingable links (40) occupying vertical planes near side areas (26) of the base; each said second link (40) having a second fixed pivot connection (34b) with a rear end area of the base; each said second link having a slidable pivot connection (35c, 43) with the seat platform at a point thereon substantially directly above the aforementioned transverse shaft means (27); and third pivot connections (21) between the first and second links at intermediate points thereon, whereby the links form a lazy tong structure for raising or lowering the seat platform when the electrical motor is energized to rotate the screw.

2. The seat structure of claim 1: each one of the first mentioned links (33) being slightly shorter than each one of the second mentioned links (40), said third pivot connections being closer to the transverse shaft means than to the first fixed pivot connections, said third pivot connections being closer to the second fixed pivot connections than to the slidable pivot connections, whereby the seat platform undergoes a slight tilting action as its moves from the lowered position to the raised position.

3. A vertically adjustable seat structure comprising a base (15) and a seat platform (14) located directly above the base; said base having a front end wall area (30) and an intermedmediate wall area (32); first bearing means (49) carried by the front end wall area, and second bearing means (49) carried by the intermediate wall area; a horizontal screw (22) having its ends supported in the aforementioned bearing means; said horizontal screw being located midway between side areas (26) of the base to define a central front-to-rear axis for the seat structure; an electrical motor (16) mounted on the base behind the intermediate wall area so that its drive shaft (45) is in axial alignment with the screw; said drive shaft having a torque-transmitting connection (46) with the screw that enables the shaft to turn the screw when the motor is energized; a nut (24) encircling the screw for motion therealong; stationary guide means (31) located on the base near side areas (26) of the base; a support element (29) movable on each guide means for horizontal travel parallel to the screw axis; transverse shaft means (27) extending between the nut and each support element whereby the nut, shaft means and support elements form a unitary structure; a sleeve (35) encircling each said transverse shaft means (27) in the space between the nut and each support element, a first pair of links (33) occupying vertical planes near side areas of the base; each link (33) having one end thereof affixed to one of the above-mentioned sleeves, whereby the two links (33) can swing in unison around the transverse shaft means; the other end of each swingable link (33) having a first fixed pivot connection (35a) with a rear end area of the aforementioned seat platform; a second pair of swingable links (40) occupying vertical planes near side areas (26) of the base; each said second link (40) having a second fixed pivot connection (34b) with a rear end area of the base; each said second link having a slidable pivot connection (35c, 43) with the seat platform at a point thereon substantially directly above the aforementioned transverse shaft means (27); and third pivot connections (21) between the first and second links at intermediate points thereon, whereby the links form a lazy tong structure for raising or lowering the seat platform when the electrical motor is energized to rotate the screw; each one of the first mentioned links (33) being slightly shorter than each one of the second mentioned links (40), said third pivot connections being closer to the transverse shaft means than to the first fixed pivot connections, said third pivot connections being closer to the second fixed pivot connections than to the slidable pivot connections, whereby the seat platform undergoes a slight tilting action as it moves from the lowered position to the raised position.

* * * * *